(12) United States Patent (10) Patent No.: US 12,690,623 B2
Zhou et al. (45) Date of Patent: Jul. 28, 2026

(54) VAPORIZER AND ELECTRONIC VAPORIZATION DEVICE

(71) Applicant: SHENZHEN SMOORE TECHNOLOGY LIMITED, Shenzhen (CN)

(72) Inventors: Ruilong Zhou, Shenzhen (CN); Xinyu Wang, Shenzhen (CN); Bosong Zhao, Shenzhen (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 394 days.

(21) Appl. No.: 18/471,963

(22) Filed: Sep. 21, 2023

(65) Prior Publication Data

US 2024/0008552 A1 Jan. 11, 2024

Related U.S. Application Data

(63) Continuation of application No. PCT/CN2021/083035, filed on Mar. 25, 2021.

(51) Int. Cl.
A24F 40/53 (2020.01)
A24F 40/40 (2020.01)
G06Q 30/018 (2023.01)

(52) U.S. Cl.
CPC .............. A24F 40/53 (2020.01); A24F 40/40 (2020.01); G06Q 30/0185 (2013.01)

(58) Field of Classification Search
CPC .......... A24F 40/40; A24F 40/46; A24F 40/53; G06Q 30/0185
See application file for complete search history.

(56) References Cited

U.S. PATENT DOCUMENTS

| | | | |
|---|---|---|---|
| 2018/0060873 A1 | 3/2018 | Chu | |
| 2021/0386123 A1* | 12/2021 | Zhang | A24F 40/42 |
| 2021/0401061 A1* | 12/2021 | Davis | A24F 40/57 |
| 2022/0361581 A1* | 11/2022 | Lin | A24F 40/50 |

FOREIGN PATENT DOCUMENTS

| | | |
|---|---|---|
| CN | 108778384 A | 11/2018 |
| CN | 109247623 A | 1/2019 |
| CN | 110447972 A | 11/2019 |

(Continued)

OTHER PUBLICATIONS

Patent Cooperation Treaty, International Search Report and Written Opinion, International Application No. PCT/CN2021/083035 (Dec. 30, 2021).

(Continued)

*Primary Examiner* — Omer S Khan
(74) *Attorney, Agent, or Firm* — Leydig, Voit & Mayer, Ltd.

(57) ABSTRACT

A vaporizer includes: a vaporization assembly having an electrode contact; and an anti-counterfeiting assembly having an electrode connection portion. The electrode contact is connected to the electrode connection portion to connect the vaporization assembly and the anti-counterfeiting assembly in series, such that, when the vaporizer is connected to a battery rod, the anti-counterfeiting assembly communicates with the battery rod.

17 Claims, 8 Drawing Sheets

(56) References Cited

FOREIGN PATENT DOCUMENTS

| | | | |
|----|------------|---|--------|
| CN | 210445680  | U | 5/2020 |
| CN | 210988236  | U | 7/2020 |
| CN | 216723158  | U | 6/2022 |
| JP | 2009172560 | A | 8/2009 |

OTHER PUBLICATIONS

KIA Semiconductor, "SOT23 package size—SOT23 package size diagram and pin sequence arrangement—KIA MOS tube," URL: www.kiaic.com/article/detail/1006.html (Jul. 24, 2018).

Zhou et al., "Series-connected anti-counterfeiting structure of cigarette cartridges (cartridge identification)," Technical disclosure information content (Oct. 8, 2023).

* cited by examiner

114

113          121          122          123

112

114

111

113

VAPORIZER AND ELECTRONIC VAPORIZATION DEVICE

CROSS-REFERENCE TO PRIOR APPLICATION

This application is a continuation of International Patent Application No. PCT/CN2021/083035, filed on Mar. 25, 2021. The entire disclosure is hereby incorporated by reference herein.

FIELD

This application relates to the field of electronic vaporization devices, and in particular, to a vaporizer and an electronic vaporization device.

BACKGROUND

In an existing electronic vaporization device with an encryption function, generally, a PCB is arranged in a vaporizer, and a controller, a capacitor, and a MOS transistor are arranged on the PCB to implement the encryption function. During actual application, generally, a high-power MOS transistor and/or a large-capacity capacitor is required to work normally, but the high-power MOS transistor and the large-capacity capacitor are often large in size. As a result, the area of the PCB is significantly increased, which limits the size of the vaporizer and has low assembly efficiency. Because the PCB is welded by a plurality of devices, there is a large damage risk during assembly.

SUMMARY

In an embodiment, the present invention provides a vaporizer, comprising: a vaporization assembly comprising an electrode contact; and an anti-counterfeiting assembly comprising an electrode connection portion, wherein the electrode contact is connected to the electrode connection portion to connect the vaporization assembly and the anti-counterfeiting assembly in series, such that, when the vaporizer is connected to a battery rod, the anti-counterfeiting assembly is configured to communicate with the battery rod.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
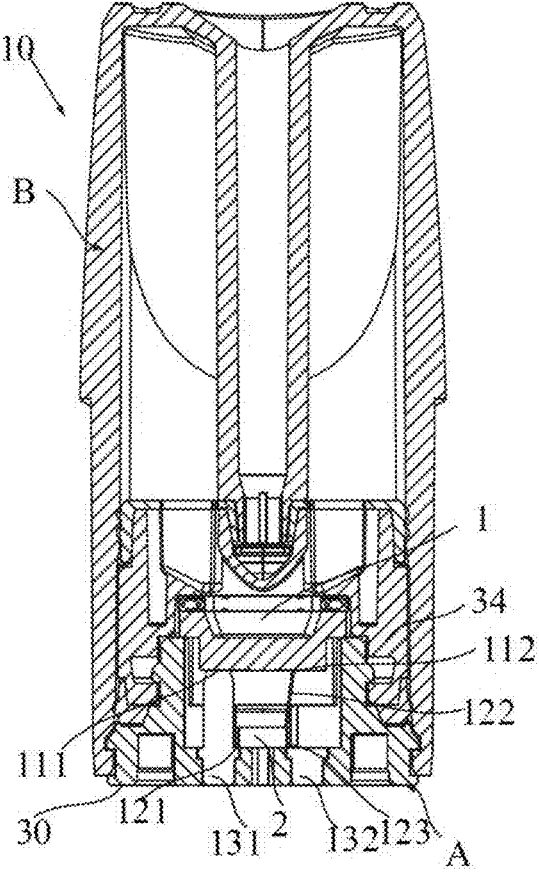
FIG. 1, FIG. 2, and FIG. 3 are schematic structural diagrams of a first embodiment of a vaporizer according to this application.

In an embodiment, the present invention provides a vaporizer and an electronic vaporization device, which can improve assembly efficiency and reduce costs.

In an embodiment, the present invention provides a vaporizer, including a vaporization assembly, where the vaporization assembly includes an electrode contact; and an anti-counterfeiting assembly, where the anti-counterfeiting assembly includes an electrode connection portion; and the electrode contact is connected to the electrode connection portion to connect the vaporization assembly and the anti-counterfeiting assembly in series, so that when the vaporizer is connected to a battery rod, the anti-counterfeiting assembly can communicate with the battery rod.

The anti-counterfeiting assembly further includes: an anti-counterfeiting unit, electrically connected to the electrode connection portion, where the anti-counterfeiting unit can communicate with the battery rod to determine whether the battery rod matches the vaporizer.

The electrode connection portion and the anti-counterfeiting unit are packaged into one independent component, or the electrode connection portion and the anti-counterfeiting unit are two independently arranged components.

The anti-counterfeiting unit is a wafer, or the anti-counterfeiting unit includes a wafer and a package body wrapping the wafer.

The vaporizer further includes: an ejector pin, where the electrode contact is connected to the electrode connection portion through the ejector pin, and the vaporizer is connected to the battery rod through the ejector pin.

The ejector pin includes a first ejector pin and a second ejector pin; the electrode contact includes a first electrode contact and a second electrode contact; the electrode connection portion includes a first electrode connection portion, a second electrode connection portion, and a third electrode connection portion that are electrically connected to the anti-counterfeiting unit; and the first electrode contact and the first electrode connection portion are electrically connected to the first ejector pin, the second electrode connection portion is electrically connected to the second electrode contact, and the third electrode connection portion is electrically connected to the second ejector pin.

The anti-counterfeiting assembly is located between the first ejector pin and the second ejector pin; and the first electrode connection portion extends from the anti-counterfeiting assembly to the first ejector pin; the second electrode connection portion extends from the anti-counterfeiting assembly to the second electrode contact; and the third electrode connection portion extends from the anti-counterfeiting assembly to the second ejector pin.

The first ejector pin has a first flange, the first electrode connection portion is at least partially arranged on a surface of the first flange facing the vaporization assembly, and the third electrode connection portion is at least partially arranged on an end surface of a first end of the second ejector pin.

The ejector pin further includes a third ejector pin; and the third ejector pin is electrically connected to the second electrode contact, and the second electrode connection portion is electrically connected to the third ejector pin, to be electrically connected to the second electrode contact through the third ejector pin.

The first ejector pin has a first flange, the third ejector pin has a second flange, the first electrode connection portion is at least partially arranged on a surface of the first flange facing the vaporization assembly, the second electrode connection portion is at least partially arranged on a surface of the second flange facing the vaporization assembly, and the third electrode connection portion is at least partially arranged on an end surface of a first end of the second ejector pin.

The first ejector pin and the second ejector pin are arranged corresponding to two ends of a vaporization core of the vaporization assembly in a length direction, and the third ejector pin is located between the first ejector pin and the second ejector pin, and is located on one side of a connecting line of the first ejector pin and the second ejector pin.

The first ejector pin and the third ejector pin are arranged corresponding to two ends of a vaporization core of the vaporization assembly in a length direction, and the second ejector pin is located between the first ejector pin and the third ejector pin, and is located on one side of a connecting line of the first ejector pin and the third ejector pin.

The ejector pin includes a first ejector pin and a second ejector pin; the electrode contact includes a first electrode contact and a second electrode contact; the electrode connection portion includes a first electrode connection portion, a second electrode connection portion, and a third electrode connection portion that are electrically connected to the anti-counterfeiting unit; the vaporizer further includes a first electrode lead extending from the first electrode contact, and a second electrode lead extending from the second electrode contact; and the first electrode lead and the first electrode connection portion are electrically connected to the first ejector pin, the second electrode connection portion is electrically connected to the second electrode lead, and the third electrode connection portion is electrically connected to the second ejector pin.

A first end of the first ejector pin has a first blind hole, and a first end of the second ejector pin has a second blind hole; the first electrode connection portion, the second electrode connection portion, and the third electrode connection portion extend from a surface of the anti-counterfeiting assembly close to the vaporization assembly; and one end of the first electrode lead and one end of the first electrode connection portion are both fixed in the first blind hole, and one end of the third electrode connection portion is fixed in the second blind hole.

The ejector pin further includes a third ejector pin; and a first end of the third ejector pin close to the vaporization assembly has a third blind hole, and one end of the second electrode connection portion and one end of the second electrode lead are both fixed in the third blind hole.

The first ejector pin and the second ejector pin are arranged corresponding to two ends of a vaporization core of the vaporization assembly in a length direction, and the third ejector pin is located between the first ejector pin and the second ejector pin, and is located on one side of a connecting line of the first ejector pin and the second ejector pin.

The first ejector pin and the third ejector pin are arranged corresponding to two ends of a vaporization core of the vaporization assembly in a length direction, and the second ejector pin is located between the first ejector pin and the third ejector pin, and is located on one side of a connecting line of the first ejector pin and the third ejector pin.

To resolve the foregoing technical problems, a second technical solution provided in this application is: providing an electronic vaporization device, including a vaporizer and a battery rod that are connected to each other, where the battery rod is configured to supply power to the vaporizer, and the vaporizer is the vaporizer according to any one of the foregoing.

Compared with the related art, beneficial effects of this application are as follows: The vaporizer and the electronic vaporization device provided in this application include: a vaporization assembly, where the vaporization assembly includes an electrode contact; and an anti-counterfeiting assembly, where the anti-counterfeiting assembly includes an electrode connection portion; and the electrode contact is connected to the electrode connection portion to connect the vaporization assembly and the anti-counterfeiting assembly in series, so that when the vaporizer is connected to a battery rod, the anti-counterfeiting assembly can communicate with the battery rod. The anti-counterfeiting assembly replaces a circuit board to implement a communication encryption function, and resolve problems of an excessive area of a PCB and low assembly efficiency in the related art, thereby improving the assembly efficiency and reducing costs.

The technical solutions in the embodiments of this application are clearly and completely described below with reference to the accompanying drawings in the embodiments of this application. Apparently, the described embodiments are merely some rather than all of the embodiments of this application. Based on the embodiments of this application, all other embodiments obtained by a person of ordinary skill in the art without creative efforts shall fall within the protection scope of this application.

FIG. 1 is a schematic structural diagram of an embodiment of a vaporizer according to this application. The vaporizer 10 may be applied to the fields such as electronic vaporization devices and medical vaporization. The vaporizer 10 is featured with a simple structure, so that an automatic installation method can be adopted to simplify an installation process, improve assembly efficiency, save labor costs during assembly, and avoid some manual errors during the assembly.

In some embodiments, the vaporizer 10 may include a vaporization unit A and a liquid storage unit B sleeved on the vaporization unit A, and the liquid storage unit B is in liquid guide connection to the vaporization unit A. The vaporization unit A may be configured to heat and vaporize a liquid medium stored in the liquid storage unit B, and the liquid storage unit B is configured to store the liquid medium and export an aerosol.

Specifically, in some embodiments, the vaporization unit A may include a vaporization base 30, a vaporization assembly 1, and a vaporization top base 34. In some embodiments, the vaporization base 30 may be elliptical, and may be configured to be electrically connected to a battery rod, and the vaporization assembly 1 is mounted on the vaporization base 30. The vaporization top base 34 is sleeved or clamped on the vaporization base 30 from top to bottom, and covers the vaporization assembly 1. The vaporization top base 34 may include an integrally-formed sleeve, and the sleeve may be sleeved on the vaporization base 30 to accommodate the vaporization assembly 1 and form a vaporization cavity 36. The vaporization base 30, the vaporization assembly 1, and the vaporization top base 34 are not limited in structure and may be designed according to different types of the vaporizer 10.

Figure 2:
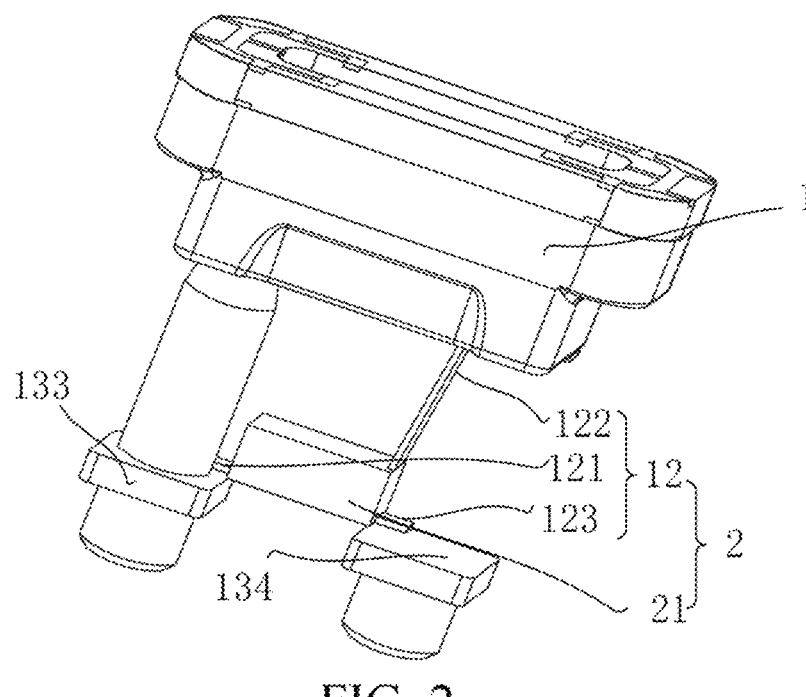
Figure 3:
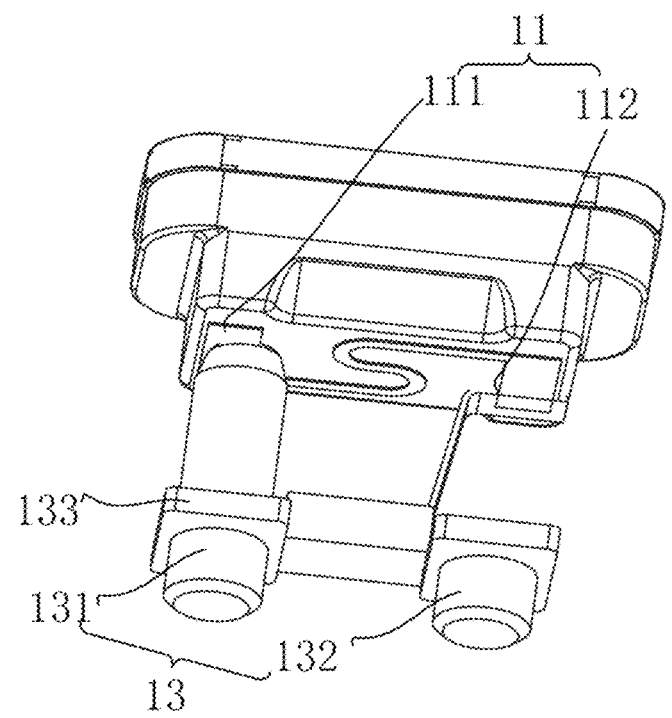

Specifically, with reference to FIG. 2 and FIG. 3, the vaporizer 10 further includes an anti-counterfeiting assembly 2, the vaporization assembly 1 includes an electrode contact 11, and the anti-counterfeiting assembly 2 includes an electrode connection portion 12. The electrode contact 11 is connected to the electrode connection portion 12 to connect the vaporization assembly 1 and the anti-counterfeiting assembly 2 in series, so that when the vaporizer is connected to the battery rod, the anti-counterfeiting assembly 2 can communicate with the battery rod. Specifically, the anti-counterfeiting assembly 2 is arranged inside the vaporizer 10. Preferably, as shown in FIG. 1, the anti-counterfeiting assembly 2 is arranged in an accommodating cavity of the vaporization base 30.

Figure 4:
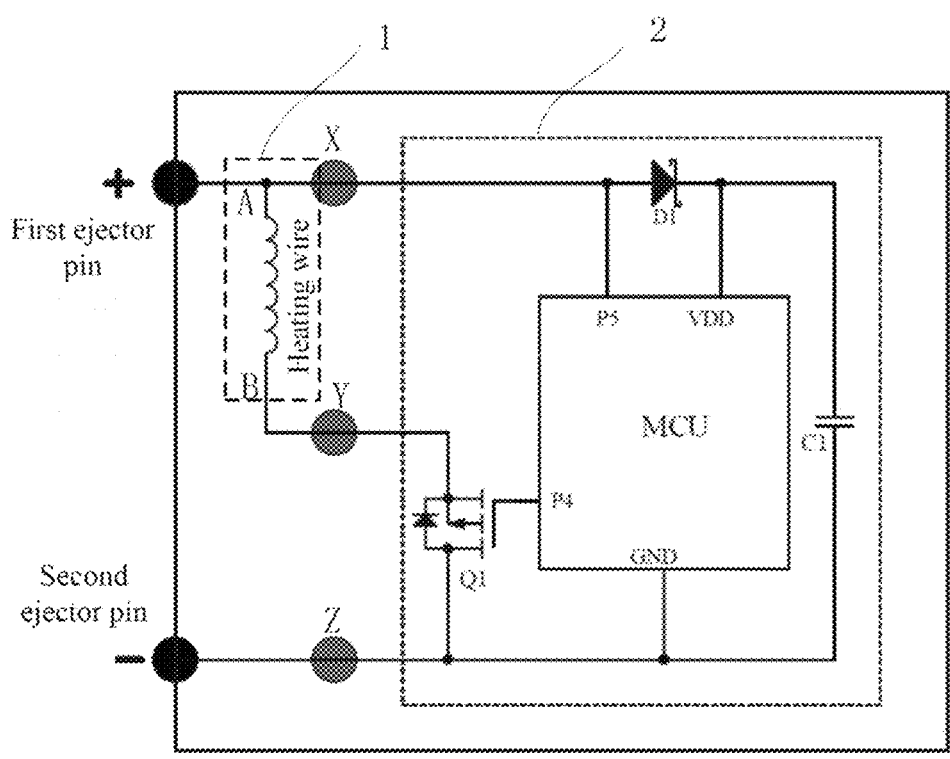
FIG. 4 is a schematic structural diagram of a circuit of the vaporizer according to this application.

Specifically, as shown in FIG. 4, a heating wire is the vaporization assembly 1, and the vaporization assembly 1 is connected to the anti-counterfeiting assembly 2 in series. Specifically, the anti-counterfeiting assembly 2 includes a first connection end X, a second connection end Y, and a third connection end Z. As shown in the figure, the first connection end X is connected to a first end A of the heating wire, and the second connection end Y is connected to a second end B of the heating wire. Specifically, the anti-counterfeiting assembly 2 includes an anti-counterfeiting chip MCU, and the anti-counterfeiting chip MCU has a first driving port P4, a second driving port P5, a power supply voltage port VDD, and a ground voltage port GND. The first driving port P4 is connected to a control end of a switch Q1, the second driving port P5 is connected to the first end of the heating wire and the first connection end X, the second end of the heating wire is connected to a first path end of the switch Q1, and a second path end of the switch Q1 is connected to the third connection end Z. Specifically, the ground voltage port GND is connected to the third connection end Z, the second driving port P5 is connected to the power supply voltage port VDD through a diode D1, and the power supply voltage port VDD and the ground voltage port GND are connected in parallel with a capacitor C1.

Specifically, when the vaporizer is connected to the battery rod, the switch Q1 inside the vaporizer is in a disconnected state when the battery rod is in an initial state of power supply, the battery rod sends a data signal to the vaporizer, and the second driving port P5 of the vaporizer receives the data signal. When the data signal is at a high level, the capacitor C1 takes power through the diode D1, and when the data signal is at a low level, the capacitor C1 supplies power to the anti-counterfeiting chip MCU to maintain working of the MCU. The vaporizer performs anti-counterfeiting authentication based on the received data signal through the anti-counterfeiting chip MCU. After the authentication succeeds, the switch Q1 is controlled to be on through the first driving port P4, and the battery rod supplies power to control the heating wire to start heating for vaporization. The anti-counterfeiting assembly replaces a circuit board to implement a communication encryption function, and resolve problems of an excessive area of a PCB and low assembly efficiency in the related art, thereby improving the assembly efficiency and reducing costs.

Specifically, in an embodiment, the anti-counterfeiting assembly 2 further includes an anti-counterfeiting unit 21, where the anti-counterfeiting unit 21 is electrically connected to the electrode connection portion 12, and the anti-counterfeiting unit 21 can communicate with the battery rod to determine whether the battery rod matches the vaporizer. In an embodiment, the electrode connection portion 12 and the anti-counterfeiting unit 21 are packaged into one independent component, or the electrode connection portion 12 and the anti-counterfeiting unit 21 are two independently arranged components.

In an embodiment, the anti-counterfeiting unit 21 is a wafer, or the anti-counterfeiting unit 21 includes a wafer and a package body wrapping the wafer.

In an embodiment, the vaporizer further includes an ejector pin 13, where the electrode contact 11 is connected to the electrode connection portion 12 through the ejector pin 13, and the vaporizer is connected to the battery rod through the ejector pin 13.

Specifically, as shown in FIG. 4, the first connection end X and the first end A of the heating wire are connected to a first ejector pin, and the first ejector pin serves as a positive electrode + of the vaporizer. The third connection end Z is connected to a second ejector pin, and the second ejector pin serves as a negative electrode − of the vaporizer.

Specifically, as shown in FIG. 2 and FIG. 3, the ejector pin 13 includes a first ejector pin 131 and a second ejector pin 132. The electrode contact 11 includes a first electrode contact 111 (corresponding to the first end A of the heating wire) and a second electrode contact 112 (corresponding to the second end B of the heating wire). The electrode connection portion 12 includes a first electrode connection portion 121 (corresponding to the first connection end X), a second electrode connection portion 122 (corresponding to the second connection end Y), and a third electrode connection portion 123 (corresponding to the third connection end Z) that are electrically connected to the anti-counterfeiting unit 21.

The first ejector pin 131 is electrically connected to the first electrode contact 111 and the first electrode connection portion 121, the second electrode connection portion 122 is electrically connected to the second electrode contact 112, and the third electrode connection portion 123 is electrically connected to the second ejector pin 132.

Specifically, a first end of the first ejector pin 131 abuts against the first electrode contact 111, and a second end of the first ejector pin 131 extends to a bottom of the vaporizer to serve as a first electrode of the vaporizer. In this embodiment, the first electrode is the positive electrode + of the vaporizer. A second end of the second ejector pin 132 extends to the bottom of the vaporizer to serve as a second electrode of the vaporizer. In this embodiment, the second electrode is the negative electrode − of the vaporizer. Specifically, when the vaporizer is connected to the battery rod, the positive electrode + and the negative electrode − of the vaporizer are connected to positive and negative electrodes of the battery rod. The first electrode connection portion 121 is electrically connected to a middle portion of the first ejector pin 131, the second electrode connection portion 122 is electrically connected to the second electrode contact 112, and the third electrode connection portion 123 is electrically connected to a first end or a middle portion of the second ejector pin 132. Specifically, the middle portion is a position between the first end and the second end of the first ejector pin 131 or the second ejector pin 132.

Specifically, in this embodiment, the anti-counterfeiting assembly 2 is located between the first ejector pin 131 and the second ejector pin 132. The first electrode connection portion 121 extends from the anti-counterfeiting assembly 2 to the first ejector pin 131, the second electrode connection portion 122 extends from the anti-counterfeiting assembly 2 to the second electrode contact 112, and the third electrode connection portion 123 extends from the anti-counterfeiting assembly 2 to the second ejector pin 132. Specifically, the first electrode connection portion 121 extends from a surface of the anti-counterfeiting assembly 2 close to the first ejector pin 131 to the middle portion of the first ejector pin 131, the second electrode connection portion 122 extends from a surface of the anti-counterfeiting assembly 2 close to the vaporization assembly 1 to the second electrode contact 112, and the third electrode connection portion 123 extends from a surface of the anti-counterfeiting assembly 2 close to the second ejector pin 132 to the first end or the middle of the second ejector pin 132.

Specifically, as shown in FIG. 2 and FIG. 3, the first ejector pin 131 has a first flange 133, and the first electrode connection portion 121 of the anti-counterfeiting assembly 2 is lapped on the first flange 133. Specifically, the first electrode connection portion 121 is at least partially arranged on a surface of the first flange 133 facing the vaporization assembly 1.

In another embodiment, the first ejector pin 131 may further have a groove, and the first connection portion 121 of the anti-counterfeiting assembly 2 is inserted into the groove in the middle portion of the first ejector pin 131. A side wall of the second ejector pin 132 may also have a flange to facilitate connection or mounting of the anti-counterfeiting unit 21. For example, an end portion of the anti-counterfeiting unit 21 may be directly and fixedly arranged on the flanges of the first ejector pin 131 and the second ejector pin 132. In a feasible embodiment, the first connection portion 121 and the third connection portion 123 may be connected to the first ejector pin 131 and the second ejector pin 132 through welding, riveting, or crimping. Specifically, the second electrode connection portion 122 may be connected to the second electrode contact 112 through welding, riveting, or crimping.

The second electrode connection portion 122 and the third electrode connection portion 123 are in on-off connection inside the anti-counterfeiting unit 21. Specifically, the switch Q1 is connected to the second electrode connection portion 122 and the third electrode connection portion 123 inside the anti-counterfeiting unit 21.

In this embodiment, the first electrode connection portion 121 of the anti-counterfeiting assembly 2 is connected to the first electrode contact 111 of the vaporization assembly 1 through the first ejector pin 131, the second electrode connection portion 122 of the anti-counterfeiting assembly 2 is directly connected to the second electrode contact 112 of the vaporization assembly 1, and the third electrode connection portion 123 of the anti-counterfeiting assembly 2 is connected to the second ejector pin 132, to connect the vaporization assembly 1 and the anti-counterfeiting assembly 2 in series.

Figure 5:
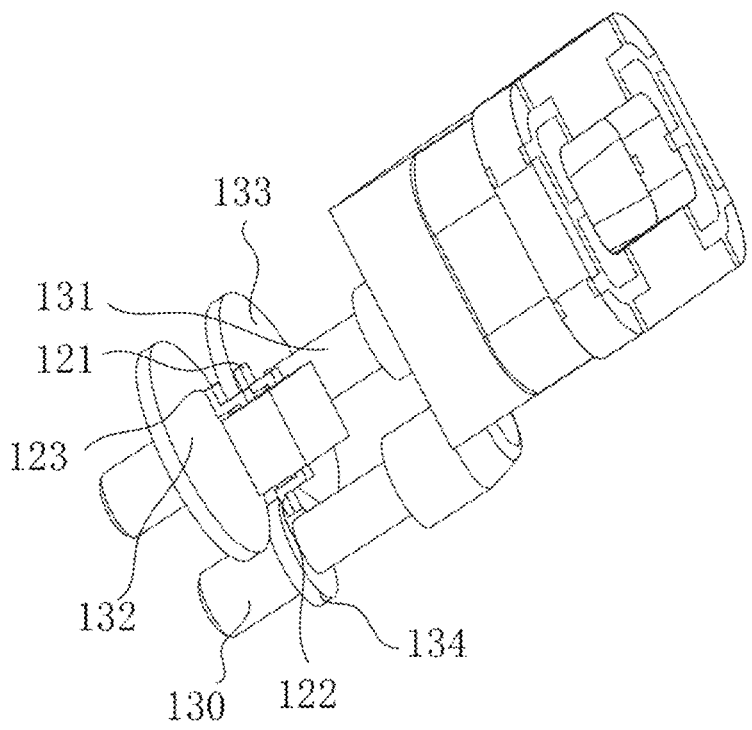
FIG. 5 and FIG. 6 are schematic structural diagrams of a second embodiment of the vaporizer according to this application.
Figure 6:
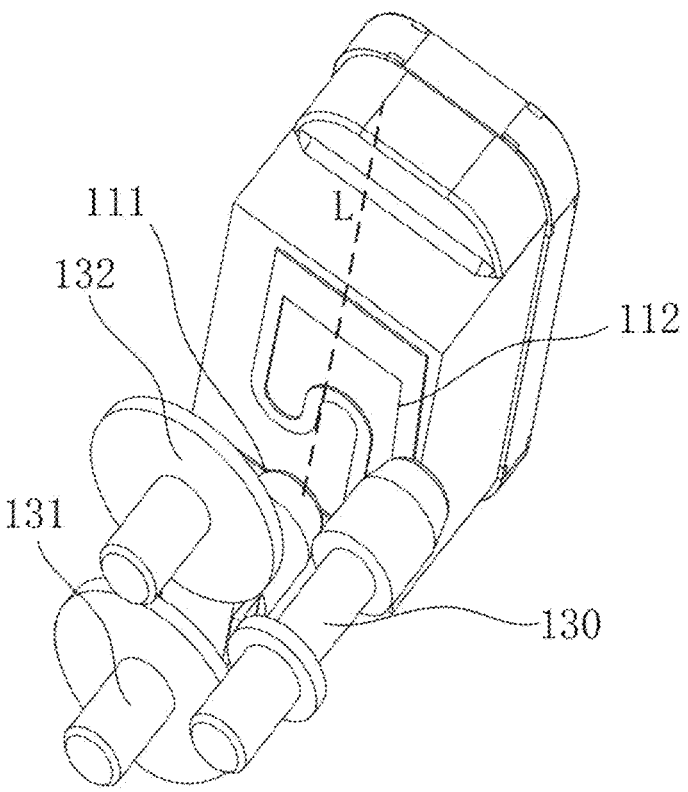

FIG. 5 and FIG. 6 are schematic structural diagrams of a second embodiment of the vaporizer according to this application. Specifically, compared with the first embodiment of FIG. 1, the difference lies in that this embodiment further includes a third ejector pin 130. A first end of the third ejector pin 130 abuts against the second electrode contact 112, and the second electrode connection portion 122 is electrically connected to a middle portion of the third ejector pin 130, to be electrically connected to the second electrode contact 112 through the third ejector pin 130.

Specifically, the first ejector pin 131 has the first flange 133, the third ejector pin 130 has a second flange 134, the first electrode connection portion 121 is at least partially arranged on a surface of the first flange 133 facing the vaporization assembly 1, the second electrode connection portion 122 is at least partially arranged on a surface of the second flange 134 facing the vaporization assembly 1, and the third electrode connection portion 123 is at least partially arranged on an end surface of the first end of the second ejector pin 132. In other embodiments, the side wall of the second ejector pin 132 may also have a flange. Further, in other embodiments, an end portion or an edge of the anti-counterfeiting unit 21 may also be directly and fixedly arranged on the flanges of the first ejector pin 131, the second ejector pin 132, and the third ejector pin 130.

In this embodiment, the first ejector pin 131 and the second ejector pin 132 are arranged corresponding to two ends of a vaporization core of the vaporization assembly 1 in a length direction L, and the third ejector pin 130 is located between the first ejector pin 131 and the second ejector pin 132, and is located on one side of a connecting line of the first ejector pin 131 and the second ejector pin 132. Specifically, the first ejector pin 131, the second ejector pin 132, and the third ejector pin 130 are distributed in a triangle shape, and a second electrode contact 112 of the vaporization assembly 1 extends to a position corresponding to the third ejector pin 130. Specifically, as shown in FIG. 6, the first electrode contact 111 and the second electrode contact 112 are not symmetrically arranged at the two ends of the vaporization core of the vaporization assembly 1 in the length direction L, the first electrode contact 111 is arranged at one end of the vaporization core of the vaporization assembly 1 in the length direction L, and the second electrode contact 112 is arranged at a middle portion close to an edge of the vaporization core of the vaporization assembly 1. As shown in FIG. 5, the first electrode connection portion 121 and the third electrode connection portion 123 extend from a surface of the anti-counterfeiting assembly 2 away from the third ejector pin 130, and are arranged on the first flange 133 of the first ejector pin 131 and the end surface of the first end of the second ejector pin 132. The second electrode connection portion 122 extends from a surface of the anti-counterfeiting assembly 2 close to the third ejector pin 130, and is arranged on the second flange 134 of the third ejector pin 130. Specifically, the first electrode connection portion 121, the second electrode connection portion 122, and the third electrode connection portion 123 may be connected to the first ejector pin 131, the second ejector pin 132, and the third ejector pin 130 through crimping, riveting, or welding.

In this embodiment, the first electrode connection portion 121 of the anti-counterfeiting assembly 2 is connected to the first electrode contact 111 of the vaporization assembly 1 through the first ejector pin 131, the second electrode connection portion 122 of the anti-counterfeiting assembly 2 is connected to the second electrode contact 112 of the vaporization assembly 1 through the third ejector pin 130, and the third electrode connection portion 123 of the anti-counterfeiting assembly 2 is connected to the second ejector pin 132, to connect the vaporization assembly 1 and the anti-counterfeiting assembly 2 in series.

Figure 7:
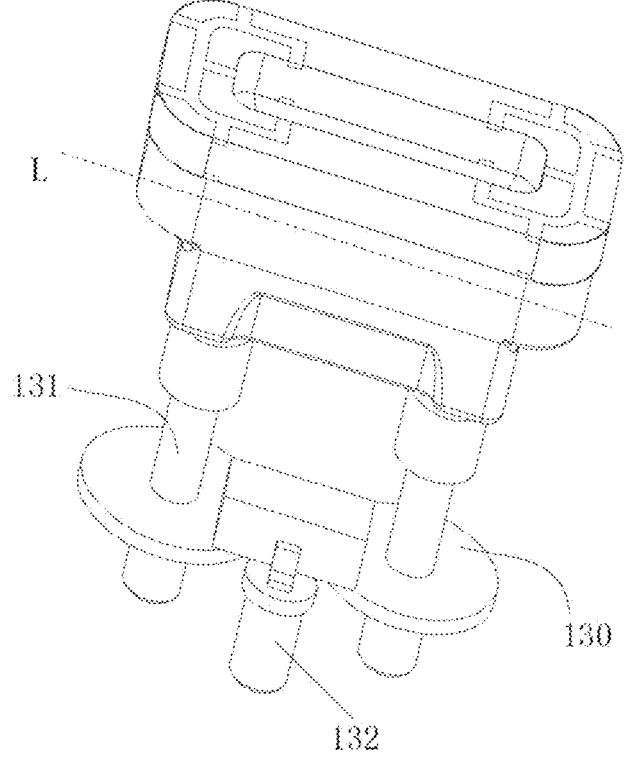
FIG. 7 is a schematic structural diagram of a third embodiment of the vaporizer according to this application.

FIG. 7 is a schematic structural diagram of a third embodiment of the vaporizer according to this application. Compared with the second embodiment, the difference lies in that, in this embodiment, the first ejector pin 131 and the third ejector pin 130 are arranged corresponding to two ends of the vaporization core of the vaporization assembly in the length direction L, and the second ejector pin 132 is located between the first ejector pin 131 and the third ejector pin 130, and is located on one side of a connecting line of the first ejector pin 131 and the third ejector pin 130. In this embodiment, the first electrode contact 111 and the second electrode contact 112 of the vaporization assembly 1 are arranged at two ends of the vaporization core in the length direction L.

In this embodiment, the first electrode connection portion 121 of the anti-counterfeiting assembly 2 is connected to the first electrode contact 111 of the vaporization assembly 1 through the first ejector pin 131, the second electrode connection portion 122 of the anti-counterfeiting assembly 2 is connected to the second electrode contact 112 of the vaporization assembly 1 through the third ejector pin 130, and the third electrode connection portion 123 of the anti-counterfeiting assembly 2 is connected to the second ejector pin 132, to connect the vaporization assembly 1 and the anti-counterfeiting assembly 2 in series. In this embodiment, because the end portion or the edge of the anti-counterfeiting unit 21 is directly and fixedly arranged on the flanges of the first ejector pin 131, the second ejector pin 132, and the third ejector pin 130, the first electrode connection portion 121, the second electrode connection portion 122, and the third electrode connection portion 123 may also be arranged on the surface of the anti-counterfeiting unit 21 close to the flanges, that is, on a bottom surface of the anti-counterfeiting unit 21.

Figures 8, 9:
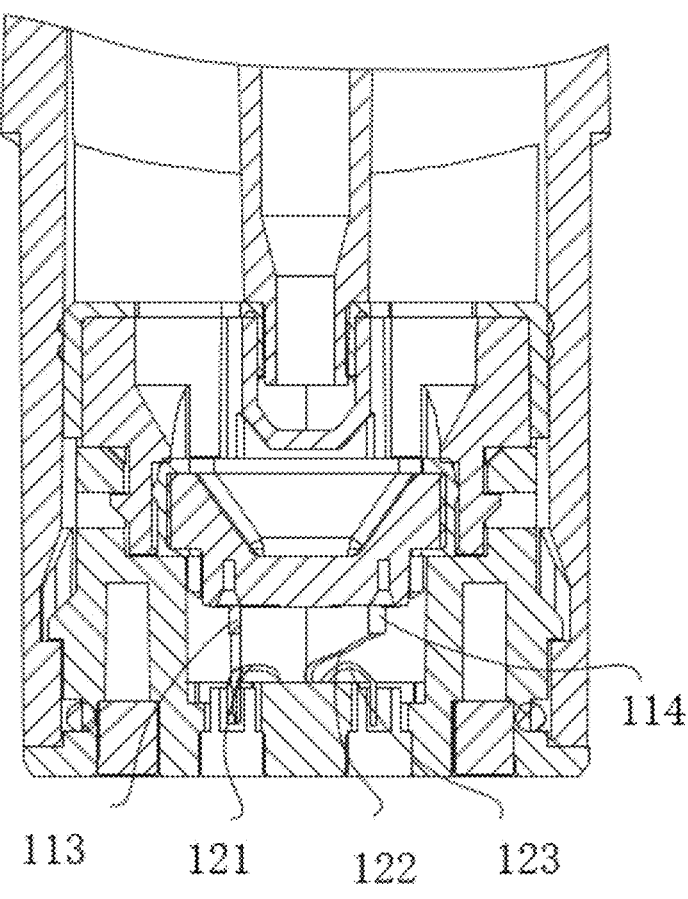
FIG. 8, FIG. 9, and FIG. 10 are schematic structural diagrams of a fourth embodiment of the vaporizer according to this application.
Figures 10, 11:
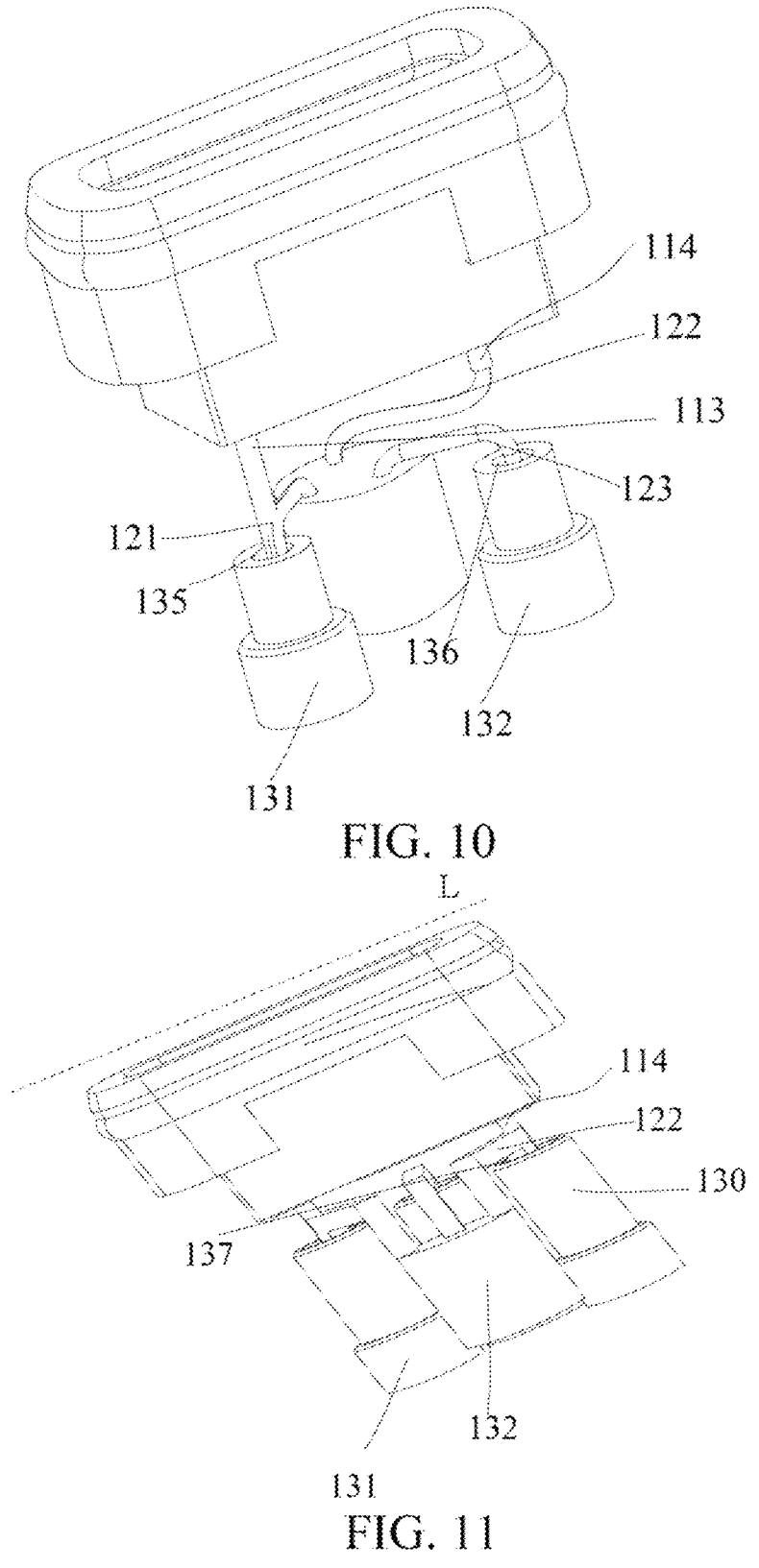
FIG. 11 is a schematic structural diagram of a fifth embodiment of the vaporizer according to this application.

FIG. 8 is a schematic structural diagram of a fourth embodiment of the vaporizer according to this application. With reference to FIG. 9 and FIG. 10, specifically, compared with the first embodiment, the difference lies in that this embodiment further includes a first electrode lead 113 extending from the first electrode contact 111, and a second electrode lead 114 extending from the second electrode contact 112.

In this embodiment, the first end of the first ejector pin 131 is electrically connected to the first electrode contact 111 through the first electrode lead 113, and the second end of the first ejector pin 131 extends to a bottom of the vaporizer to serve as a first electrode of the vaporizer. The second end of the second ejector pin 132 extends to the bottom of the vaporizer to serve as a second electrode of the vaporizer. The first electrode connection portion 121 is electrically connected to the first end of the first ejector pin 131, the second electrode connection portion 122 is electrically connected to the second electrode lead 114, and the third electrode connection portion 123 is electrically connected to the first end of the second ejector pin 132.

Specifically, as shown in FIG. 10, the first end of the first ejector pin 131 has a first blind hole 135, and the first end of the second ejector pin 132 has a second blind hole 136. The first electrode connection portion 121, the second electrode connection portion 122, and the third electrode connection portion 123 extend from a surface of the anti-counterfeiting assembly 2 close to the vaporization assembly 1. One end of the first electrode lead 113 and one end of the first electrode connection portion 121 are both fixed in the first blind hole 135, and one end of the third electrode connection portion 123 is fixed in the second blind hole 136.

In this embodiment, the first electrode connection portion 121 and the first electrode lead 113 are inserted into the first blind hole 135 and connected through the first ejector pin 131, the third electrode connection portion 123 is inserted into the second blind hole 136 and connected to the second ejector pin 132, and the second electrode connection portion 122 is welded together with the second electrode lead 114, to connect the vaporization assembly 1 and the anti-counterfeiting assembly 2 in series.

FIG. 11 is a schematic structural diagram of a fifth embodiment of the vaporizer according to this application. Compared with the fourth embodiment, the difference lies in that this embodiment further includes a third ejector pin 130. Specifically, the third ejector pin 130 has a third blind hole 137 close to the first end of the vaporization assembly 1, and one end of the second electrode connection portion 122 and one end of the second electrode lead 114 are both fixed in the third blind hole 137.

In this embodiment, the first ejector pin 131 and the third ejector pin 130 are arranged corresponding to two ends of the vaporization assembly 1 in the length direction L, and the second ejector pin 132 is located between the first ejector pin 131 and the third ejector pin 130, and is located on one side of a connecting line of the first ejector pin 131 and the third ejector pin 130. That is, the first ejector pin 131, the second ejector pin 132, and the third ejector pin 130 are distributed in a triangle shape.

Specifically, in this embodiment, the first electrode connection portion 121 and the first electrode lead 113 are inserted into the first blind hole 135 and connected through the first ejector pin 131, the third electrode connection portion 123 is inserted into the second blind hole 136 and connected to the second ejector pin 132, and the second electrode connection portion 122 and the second electrode lead 114 are inserted into the third blind hole 137 and connected through the third ejector pin 130, to connect the vaporization assembly 1 and the anti-counterfeiting assembly 2 in series.

Figure 12:
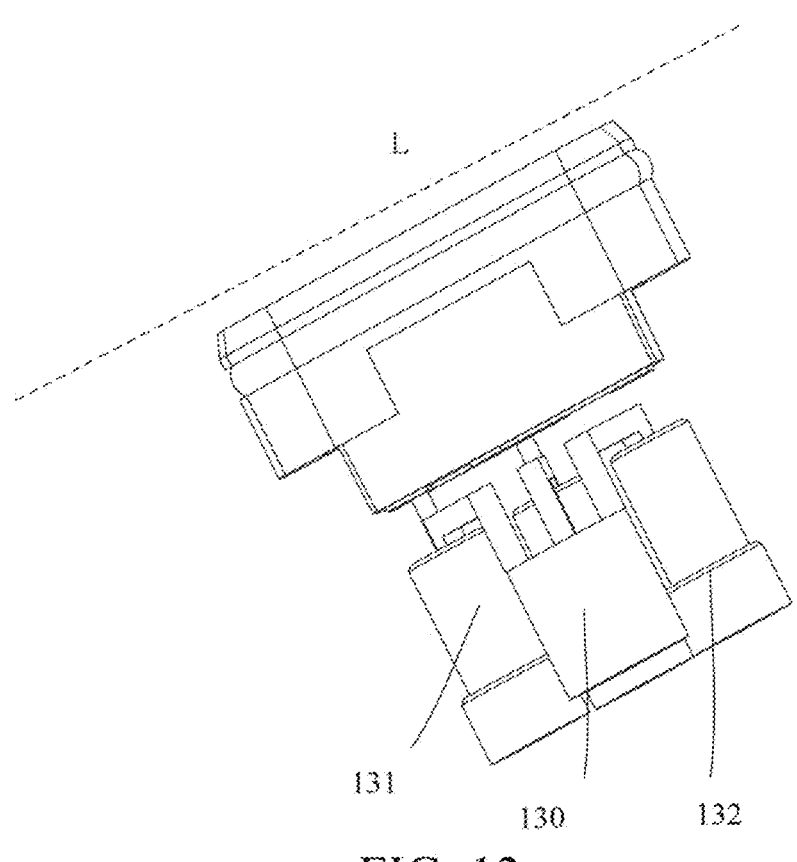
FIG. 12 and FIG. 13 are schematic structural diagrams of a sixth embodiment of the vaporizer according to this application.
Figure 13:
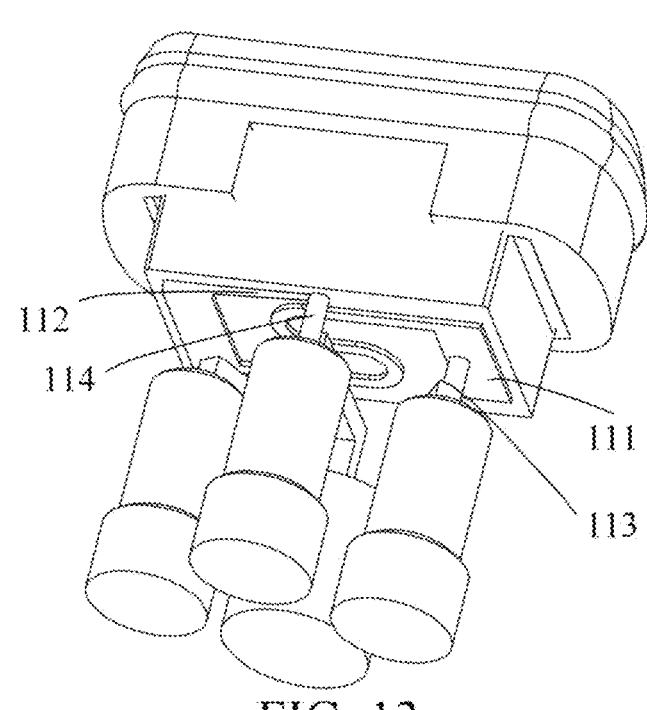

FIG. 12 and FIG. 13 are schematic structural diagrams of a sixth embodiment of the vaporizer according to this application. Compared with the fifth embodiment, the difference lies in that, in this embodiment, the first ejector pin 131 and the second ejector pin 132 are arranged corresponding to two ends of the vaporization assembly 1 in the length direction L, and the third ejector pin 139 is located between the first ejector pin 131 and the second ejector pin 132, and is located on one side of a connecting line of the first ejector pin 131 and the second ejector pin 132.

The second electrode contact 112 may extend to a position corresponding to the third ejector pin 130, and the second electrode lead 114 extends vertically and is inserted into the third blind hole 137 of the third ejector pin 130. Alternatively, the second electrode lead 114 may be led out from the second electrode contact 112 and inserted obliquely into the third blind hole 137 of the third ejector pin 130, which is not specifically limited.

In this embodiment, the first electrode connection portion 121 and the first electrode lead 113 are inserted into the first blind hole 135 and connected through the first ejector pin 131, the third electrode connection portion 123 is inserted into the second blind hole 136 and connected through the second ejector pin 132, and the second electrode connection portion 122 and the second electrode lead 114 are inserted into the third blind hole 137 and connected through the third ejector pin 130, to connect the vaporization assembly 1 and the anti-counterfeiting assembly 2 in series.

In another embodiment, alternatively, the blind holes of the first ejector pin 131, the second ejector pin 132, and the third ejector pin 130 may be omitted, and the electrode lead and the electrode connection portion are directly welded on the ejector pin.

In the vaporizer in the embodiments of the application, the anti-counterfeiting assembly is arranged to replace an existing circuit board to implement an anti-counterfeiting function. The anti-counterfeiting assembly has advantages of small space, convenient assembly, and reliable connection.

Figure 14:
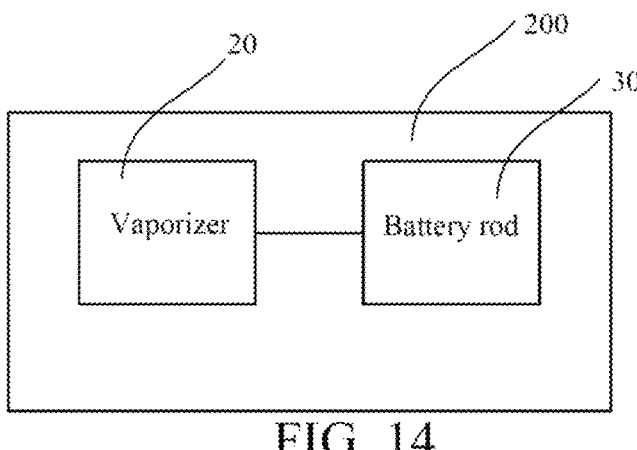
FIG. 14 is a schematic structural diagram of an embodiment of an electronic vaporization device according to this application.

FIG. 14 is a schematic structural diagram of an embodiment of an electronic vaporization device according to this application. The electronic vaporization device includes a vaporizer 20 and a battery rod 30 that are connected to each other, where the battery rod 30 is configured to supply power to the vaporizer 20, and the vaporizer 20 is the vaporizer according to any one of the first embodiment to the sixth embodiment. The electronic vaporization device may be applied to the fields such as electronic vaporization devices and medical vaporization. The electronic vaporization device is featured with a specified structure, so that an automatic installation method can be adopted to simplify an installation process, improve assembly efficiency, save labor costs during assembly, and avoid some manual errors during the assembly.

In this application, the anti-counterfeiting assembly is used to replace an existing circuit board capable of implementing communication. The simple structure of the anti-counterfeiting chip can implement small volume and reduce costs.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A vaporizer, comprising:

a vaporization assembly comprising an electrode contact;

an anti-counterfeiting assembly comprising an electrode connection portion; and at least one ejector pin, wherein the electrode contact is connected to the electrode connection portion to connect the vaporization assembly and the anti-counterfeiting assembly in series, when the vaporizer is connected to a battery rod, the anti-counterfeiting assembly being configured to communicate with the battery rod, wherein the electrode contact is connected to the electrode connection portion through the at least one ejector pin, wherein the vaporizer is connected to the battery rod through the at least one ejector pin, wherein the at least one ejector pin comprises a first ejector pin and a second ejector pin, wherein the electrode contact comprises a first electrode contact and a second electrode contact, wherein the anti-counterfeiting assembly comprises an anti-counterfeiting unit electrically connected to the electrode connection portion, wherein the electrode connection portion comprises a first electrode connection portion, a second electrode connection portion, and a third electrode connection portion that are electrically connected to the anti-counterfeiting unit, and wherein the first electrode contact and the first electrode connection portion are electrically connected to the first ejector pin, the second electrode connection portion is electrically connected to the second electrode contact, and the third electrode connection portion is electrically connected to the second ejector pin.

2. The vaporizer of claim 1, wherein the anti-counterfeiting unit is configured to communicate with the battery rod to determine whether the battery rod matches the vaporizer.

3. The vaporizer of claim 2, wherein the electrode connection portion and the anti-counterfeiting unit are packaged into one independent component.

4. The vaporizer of claim 2, wherein the anti-counterfeiting unit comprises a wafer, or wherein the anti-counterfeiting unit comprises a wafer and a package body wrapping the wafer.

5. The vaporizer of claim 1, wherein the anti-counterfeiting assembly is located between the first ejector pin and the second ejector pin, wherein the first electrode connection portion extends from the anti-counterfeiting assembly to the first ejector pin, wherein the second electrode connection portion extends from the anti-counterfeiting assembly to the second electrode contact, and wherein the third electrode connection portion extends from the anti-counterfeiting assembly to the second ejector pin.

6. The vaporizer of claim 5, wherein the first ejector pin has a first flange, wherein the first electrode connection portion is at least partially arranged on a surface of the first flange facing the vaporization assembly, and wherein the third electrode connection portion is at least partially arranged on an end surface of a first end of the second ejector pin.

7. The vaporizer of claim 1, wherein the at least one ejector pin further comprises a third ejector pin, and wherein the third ejector pin is electrically connected to the second electrode contact and the second electrode connection portion is electrically connected to the third ejector pin so as to be electrically connected to the second electrode contact through the third ejector pin.

8. The vaporizer of claim 7, wherein the first ejector pin has a first flange, wherein the third ejector pin has a second flange, wherein the first electrode connection portion is at least partially arranged on a surface of the first flange facing the vaporization assembly, wherein the second electrode connection portion is at least partially arranged on a surface of the second flange facing the vaporization assembly, and wherein the third electrode connection portion is at least partially arranged on an end surface of a first end of the second ejector pin.

9. The vaporizer of claim 8, wherein the first ejector pin and the second ejector pin are arranged corresponding to two ends of a vaporization core of the vaporization assembly in a length direction, and wherein the third ejector pin is located between the first ejector pin and the second ejector pin and is located on one side of a connecting line of the first ejector pin and the second ejector pin.

10. The vaporizer of claim 8, wherein the first ejector pin and the third ejector pin are arranged corresponding to two ends of a vaporization core of the vaporization assembly in a length direction, and wherein the second ejector pin is located between the first ejector pin and the third ejector pin and is located on one side of a connecting line of the first ejector pin and the third ejector pin.

11. A vaporizer, comprising:

a vaporization assembly comprising an electrode contact;

an anti-counterfeiting assembly comprising an electrode connection portion; and at least one ejector pin, wherein the electrode contact is connected to the electrode connection portion to connect the vaporization assembly and the anti-counterfeiting assembly in series, when the vaporizer is connected to a battery rod, the anti-counterfeiting assembly being configured to communicate with the battery rod, wherein the electrode contact is connected to the electrode connection portion through the at least one ejector pin, wherein the vaporizer is connected to the battery rod through the at least one ejector pin, wherein the at least one ejector pin comprises a first ejector pin and a second ejector pin, wherein the electrode contact comprises a first electrode contact and a second electrode contact, wherein the anti-counterfeiting assembly comprises an anti-counterfeiting unit electrically connected to the electrode connection portion, wherein the electrode connection portion comprises a first electrode connection portion, a second electrode connection portion, and a third electrode connection portion that are electrically connected to the anti-counterfeiting unit, wherein the vaporizer further comprises a first electrode lead extending from the first electrode contact and a second electrode lead extending from the second electrode contact, and wherein the first electrode lead and the first electrode connection portion are electrically connected to the first ejector pin, the second electrode connection portion is electrically connected to the second electrode lead, and the third electrode connection portion is electrically connected to the second ejector pin.

12. The vaporizer of claim 11, wherein a first end of the first ejector pin has a first blind hole, and a first end of the second ejector pin has a second blind hole, wherein the first electrode connection portion, the second electrode connection portion, and the third electrode connection portion extend from a surface of the anti-counterfeiting assembly close to the vaporization assembly, and wherein one end of the first electrode lead and one end of the first electrode connection portion are both fixed in the first blind hole, and one end of the third electrode connection portion is fixed in the second blind hole.

13. The vaporizer of claim 12, wherein the at least one ejector pin comprises a third ejector pin, wherein a first end of the third ejector pin close to the vaporization assembly has a third blind hole, and one end of the second electrode connection portion and one end of the second electrode lead are both fixed in the third blind hole.

14. The vaporizer of claim 13, wherein the first ejector pin and the second ejector pin are arranged corresponding to two ends of a vaporization core of the vaporization assembly in a length direction, and wherein the third ejector pin is located between the first ejector pin and the second ejector pin and is located on one side of a connecting line of the first ejector pin and the second ejector pin.

15. The vaporizer of claim 13, wherein the first ejector pin and the third ejector pin are arranged corresponding to two ends of a vaporization core of the vaporization assembly in a length direction, and wherein the second ejector pin is located between the first ejector pin and the third ejector pin and is located on one side of a connecting line of the first ejector pin and the third ejector pin.

16. An electronic vaporization device, comprising:

the vaporizer of claim 1; and a battery rod wherein the vaporizer and the batter rod are connected to each other, and wherein the battery rod is configured to supply power to the vaporizer.

17. An electronic vaporization device, comprising:

the vaporizer of claim 11; and a battery rod, wherein the vaporizer and the batter rod are connected to each other, and wherein the battery rod is configured to supply power to the vaporizer.

* * * * *